Jan. 23, 1940.　　　　　A. H. RZEPPA　　　　　2,187,843
　　　　　　　　　　　DRIVING AXLE
　　　　　　　　Filed Feb. 21, 1938　　　　　2 Sheets-Sheet 1
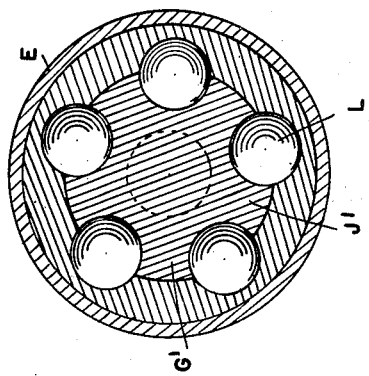
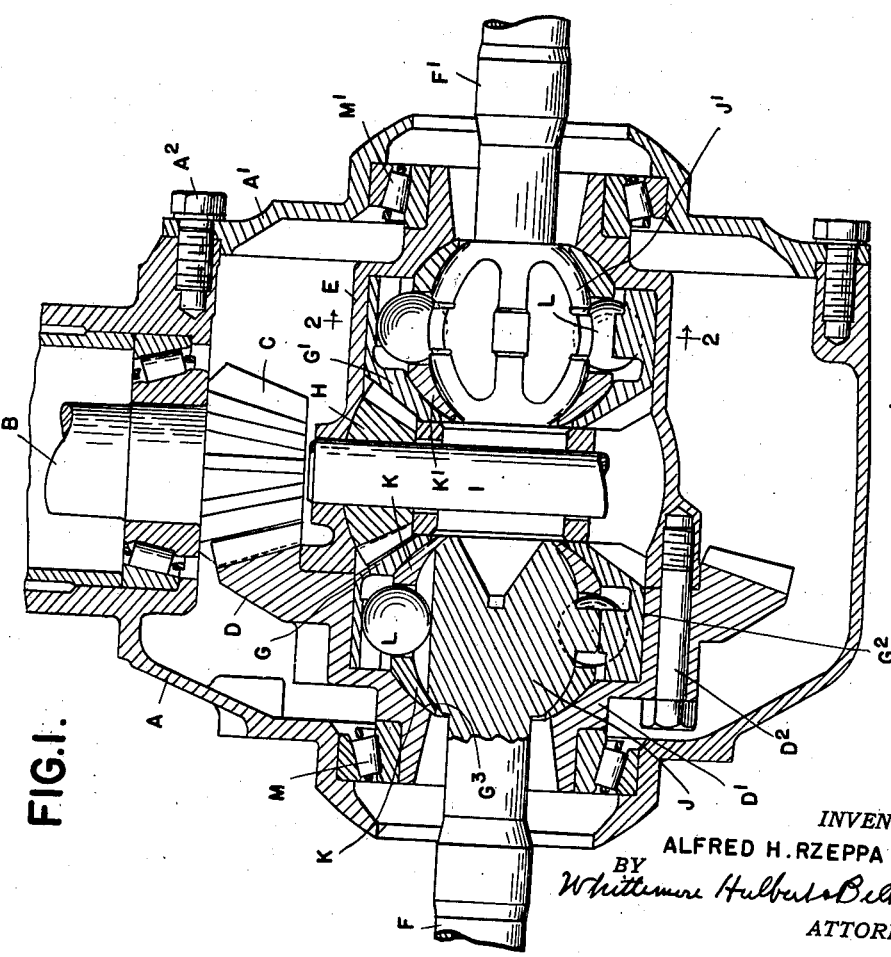
INVENTOR
ALFRED H. RZEPPA
BY
Whittemore Hulbert & Belknap
ATTORNEYS Jan. 23, 1940.                A. H. RZEPPA                    2,187,843
                               DRIVING AXLE
                           Filed Feb. 21, 1938            2 Sheets-Sheet 2

INVENTOR
ALFRED H. RZEPPA
BY
ATTORNEYS

Patented Jan. 23, 1940

2,187,843

UNITED STATES PATENT OFFICE 2,187,843

DRIVING AXLE

Alfred H. Rzeppa, Grosse Pointe, Mich.

Application February 21, 1938, Serial No. 191,746

3 Claims. (Cl. 74—311)

The invention relates to driving axles of that type in which the wheels are capable of independent oscillation. With such constructions it is usual to provide universal joints in the axle shafts for the separate wheels, which joints are generally placed outside the housing for the differential driving gears. This diminishes the length of said shafts and consequently increases the angular movement for a given vertical deflection of the wheels.

It is one of the objects of the invention to obtain a construction of axle of this type in which the length of shaft between the universal and the wheel is increased. To this end the invention consists:

First, in a construction where the universal joint for the axial shaft is placed within the housing of the driving gears;

Second, a construction having the universal joint for the axle within the revoluble differential gearing housing;

Third, a construction in which the universal joint for the axle shaft is within a driven gear of the differential gearing;

Fourth, in a construction where the driven gear of the differential gearing forms an element of the universal joint for transmitting torque from said gear to an axle shaft;

Fifth, in other features of construction, as hereinafter set forth.

In the drawings:

Figure 1 is a horizontal section through a portion of my improved axle including the housing for all of the axle gears and a portion of the shafts driven thereby;

Figure 2 is a cross section on line 2—2 of Figure 1;

Figure 4:
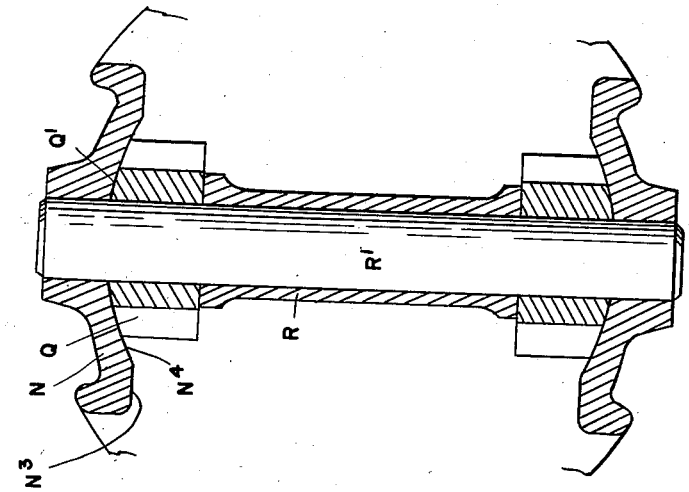
Figure 4 is a cross section on line 4—4 of Figure 3.

As shown, A is the housing which encloses all of the gearing. B is the propeller shaft having the beveled pinion C which intermeshes with the beveled ring gear D. E is the revoluble carrier for the differential gearing and F and F'' are the axle shafts driven through said gearing.

The universal joints for permitting oscillation of the shafts F and F'' are located within the housing A thereby increasing the effective length of said shafts. This length is further increased by locating said universal joints within the driven gears of the differential gearing. Thus as shown, the carrier E has therein the coaxial beveled gear wheels G and G' with the intermediate beveled pinions H mounted on a radially extending cross shaft I. Within the gears G and G' are located universal joints, preferably of the constant velocity type which transmit the driving torque from said gears respectively to the shafts F and F''. Each of these universals comprises spherically engaged inner and outer members provided with registering axially extending grooves with balls in said grooves for transmitting torque from the one member to the other. The outer member is preferably formed as an integral portion of the gear G or G', and the inner members J and J' may, if desired, be formed integral with the shafts F and F''. The engagement between the outer and inner members is formed by spherical surfaces thereon, together with pilot members K, K and K', and K' arranged therebetween and having corresponding spherical surfaces. Preferably, these spherical surfaces are concentric with a plurality of points in the axes of the members, thereby causing the automatic movement of the pilots one-half the angular movement of the shaft members. The pilot members directly engage the balls L and thus these balls are also moved into a plane which bisects the angle of the axis of the shaft with the axis of the outer member of the joint. The result is that constant velocity or constant speed ratio between the outer and inner members of the joint is maintained in all portions of each cycle.

The elements above described are assembled as follows:

The outer casing A is preferably formed with a detachable end plate A' secured to the body portion by screws A² or other suitable means. The carrier E for the differential gearing is also composed of sections and as shown one section D' is formed integral with the ring gear D and is secured to the other section by bolts D². Both of these sections are formed with cylindrical bearing surfaces G² for the gears G and G' and are further provided with segmental spherical surfaces G³ for engagement with one of the pilots K or K'. The housing E is mounted in the outer housing A by anti-friction bearings M which as shown are radial and end thrust roller bearings, one being in the portion A and the other in the end plate A'. The order of assembly is first to assemble the shafts F and F'' having the enlarged portions J and J' with the pilots K, K, and K', K' and the gear members G and G'. The shaft F and associated parts are then assembled with the member D' engaging the gear wheel G with the cylindrical bearing therefor G² and in the same manner assembling the shaft F'' and the associated parts with the housing portion E. The pinions H are then placed in position in the housing E and upon the supporting pin or shaft I, after which the portion E of the housing and the portion D' can be assembled with each other and screwed by the screws D². All of the parts thus assembled can then be engaged with the housing A and anti-friction bearings M and M', after which the end plate A', together with the anti-friction bearing M' is placed in position and secured by the screws A². The pinion C may then be placed in position to engage the ring gear D which completes the assembly.

Figure 3:
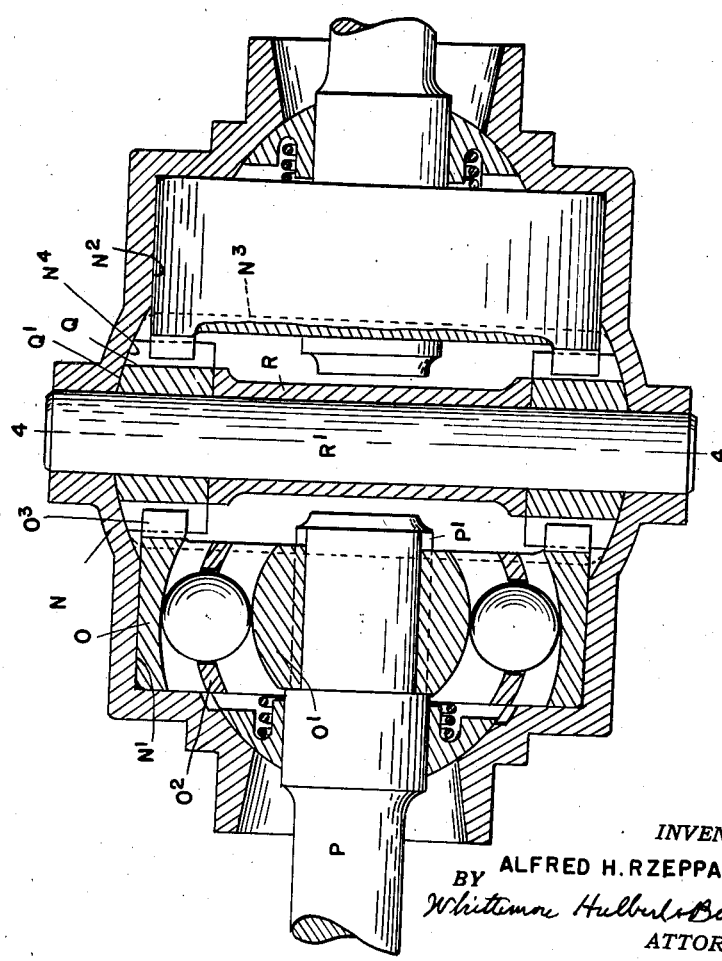
Figure 3 is a view similar to a portion of Figure 1 showing a slightly modified construction.

In Figures 3 and 4, I have shown a modified construction employing an integral carrier for the differential gearing so designed as to permit of the assembly of the elements of the mechanism therein. In this construction the carrier N is provided at its opposite ends with cylindrical recesses N' and N² for receiving the universal joint assembly. This assembly includes the outer member O, the inner member O', and the intermediate ball cage member O², all of which have spherical surfaces for engagement with each other. The axle shafts P have a splined engagement P' with the inner member O' so as to permit of insertion and removal through an opening in the end of the carrier N, while the universal joint assembly remains in said carrier. To permit of introduction of these joint assemblies into the carrier, the latter has an opening N³ in the central portion thereof of sufficient dimensions for that purpose. Thus the joint assemblies may be succesively introduced through the opening N³ and then moved axially into engagement respectively with the cylindrical recesses N' and N². The outer member O of each joint assembly also constitutes a gear of the crown type having laterally projecting teeth O³ for engagement with intermediate pinions Q. These are formed with segmental spherical end portions Q' engageable with segmental spherical recesses N⁴ on diametrically opposite sides of the central portion of the carrier N. A spacer sleeve R is arranged between these pinions and a pin or shaft R' is insertable through apertures in the carrier N into engagement with the pinions Q and spacer R, thereby holding these parts in proper position. Thus, at the completion of the assembly the teeth O³ on the members O will be in mesh with the teeth of the pinions Q arranged therebetween, thereby forming the differential gearing. The shafts P may then be inserted through the opposite ends of the carrier N into engagement with the inner members O', which latter will permit a limited angular movement of said shafts.

What I claim as my invention is:

1. In an axle, a differential gearing having coaxial driven gears, an integral carrier for said gearing formed with cylindrical portions constituting bearings for said driven gears and provided with an opening in the central portion of the wall thereof, axle shafts extending into said carrier, and a constant velocity type of universal joint for transmitting torque from each of said driven gears to the corresponding axle, said universal joint and gear constituting an assembly insertable through the central opening in the wall of said carrier and adjustable axially into engagement with said cylindrical bearing.

2. In an axle, a differential gearing having coaxial driven gears and intermediate gears, an integral carrier for said gearing having cylindrical recesses on opposite sides of the center thereof constituting bearings for said driven gears, said carrier also having an opening in a wall thereof, shafts extending axially into said carrier, and a constant velocity type of universal joint within each of said driven gears for transmitting torque therefrom to the corresponding shaft, said gears and universal joints being insertable through the opening in said carrier to be assembled inside thereof.

3. In an axle, a differential gearing having coaxial driven gears and intermediate gears, an integral carrier for said gearing having cylindrical recesses on opposite sides of the center thereof constituting bearings for said driven gears, said carrier also having an opening in a wall thereof, shafts extending axially into said carrier, and constant velocity type of universal joint assemblies each having one of its elements integral with one of said driven gears and transmitting torque therefrom to the corresponding shaft, said universal joints and gears being insertable through said opening in said carrier to be assembled inside thereof.

ALFRED H. RZEPPA.